United States Patent
Nakano et al.

(10) Patent No.: US 6,864,604 B2
(45) Date of Patent: Mar. 8, 2005

(54) COOLING STRUCTURE FOR MULTI-SHAFT, MULTI-LAYER ELECTRIC MOTOR

(75) Inventors: Masaki Nakano, Yokohama (JP); Takashi Kato, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/476,171

(22) PCT Filed: Mar. 28, 2003

(86) PCT No.: PCT/JP03/03922

§ 371 (c)(1),
(2), (4) Date: Nov. 3, 2003

(87) PCT Pub. No.: WO03/084029

PCT Pub. Date: Oct. 9, 2003

(65) Prior Publication Data

US 2004/0145246 A1 Jul. 29, 2004

(30) Foreign Application Priority Data

Apr. 1, 2002 (JP) .................................. 2002-098257
Aug. 8, 2002 (JP) .................................. 2002-231676

(51) Int. Cl.[7] .............................................. H02K 9/08
(52) U.S. Cl. ...................... 310/57; 310/266; 310/114
(58) Field of Search ............................ 310/52–64, 11, 310/266, 112, 114

(56) References Cited

U.S. PATENT DOCUMENTS

| | | | | |
|---|---|---|---|---|
| 2,330,121 A | * | 9/1943 | Heintz | 310/52 |
| 3,308,318 A | * | 3/1967 | Dunaiski et al. | 310/114 |
| 4,577,127 A | * | 3/1986 | Ferree et al. | 310/83 |
| 5,019,733 A | * | 5/1991 | Kano et al. | 310/61 |
| 6,049,152 A | | 4/2000 | Nakano | 310/114 |
| 6,114,784 A | | 9/2000 | Nakano | 310/59 |

FOREIGN PATENT DOCUMENTS

| | | |
|---|---|---|
| EP | 0 688 090 A1 | 12/1995 |
| EP | 1 164 688 A2 | 12/2001 |
| JP | 2000-14086 A | 1/2000 |

* cited by examiner

*Primary Examiner*—Dang Le
(74) *Attorney, Agent, or Firm*—Foley & Lardner LLP

(57) ABSTRACT

A multi-shaft, multi-layer motor includes an inner rotor, an outer rotor surrounding the inner rotor, and a stator disposed coaxially between the inner and outer rotors. The motor further includes an outer member surrounding the outer rotor and defining a first wet chamber between the outer rotor and the outer member; an inner member defining a second wet chamber surrounded by the inner rotor; and an intermediate member defining a dry chamber communicating with an outer air gap between the stator and the outer rotor, and an inner air gap between the stator and the inner rotor.

16 Claims, 8 Drawing Sheets

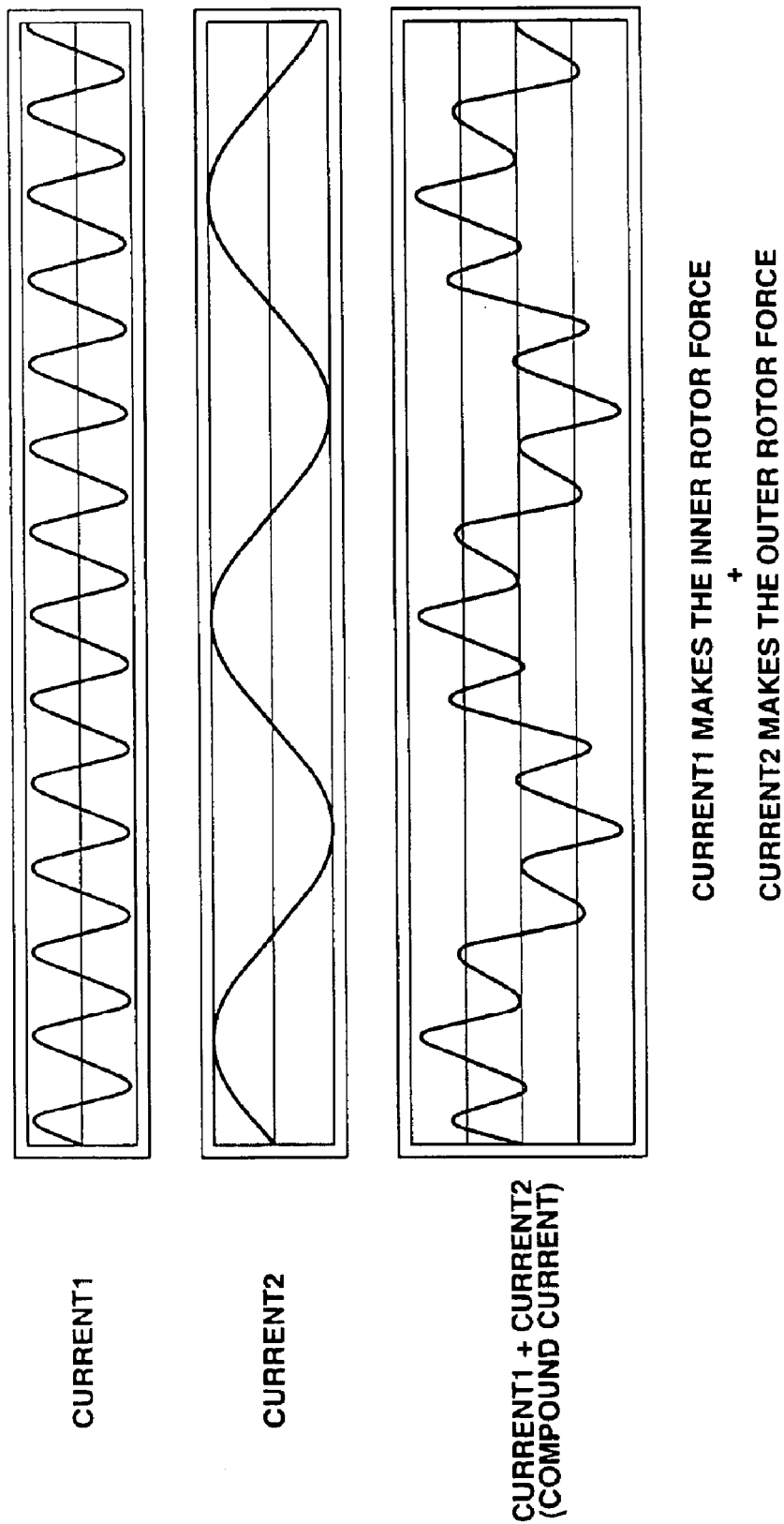

COOLING STRUCTURE FOR MULTI-SHAFT, MULTI-LAYER ELECTRIC MOTOR

TECHNICAL FIELD

The present invention relates to a cooling structure for an electric motor, and more specifically to a cooling structure for a multi-shaft, multi-layer motor which can be used for a hybrid drive unit for a hybrid vehicle.

BACKGROUND ART

Published Japanese Patent Application, Kokai No. 2000-14086 shows a cooling structure of multi-shaft, multi-layer motor. This structure includes coolant passages for cooling a stator having coils.

DISCLOSURE OF INVENTION

It is an object of the present invention to provide a cooling structure for cooling a rotor or rotors.

According to the present invention, an apparatus comprises: an inner rotor; an outer rotor surrounding the inner rotor; a stator disposed coaxially between the inner and outer rotors, and arranged to form a multi-shaft, multi-layer motor with the inner and outer rotors; a first member surrounding the outer rotor and defining a first wet chamber between the outer rotor and the first member; a second member defining a second wet chamber surrounded by the inner rotor; and a third member defining a dry chamber communicating with an outer air gap between the stator and the outer rotor, and an inner air gap between the stator and the inner rotor.

The other objects and features of this invention will become understood from the following description with reference to the accompanying drawings.

BRIEF DESCRIPTION OF DRAWINGS

FIG. 8 is a graph showing a compound current supplied to stator coils of the multi-shaft, multi-layer motor according to the embodiment.

MODE(S) FOR CARRYING OUT THE INVENTION

Figure 1:
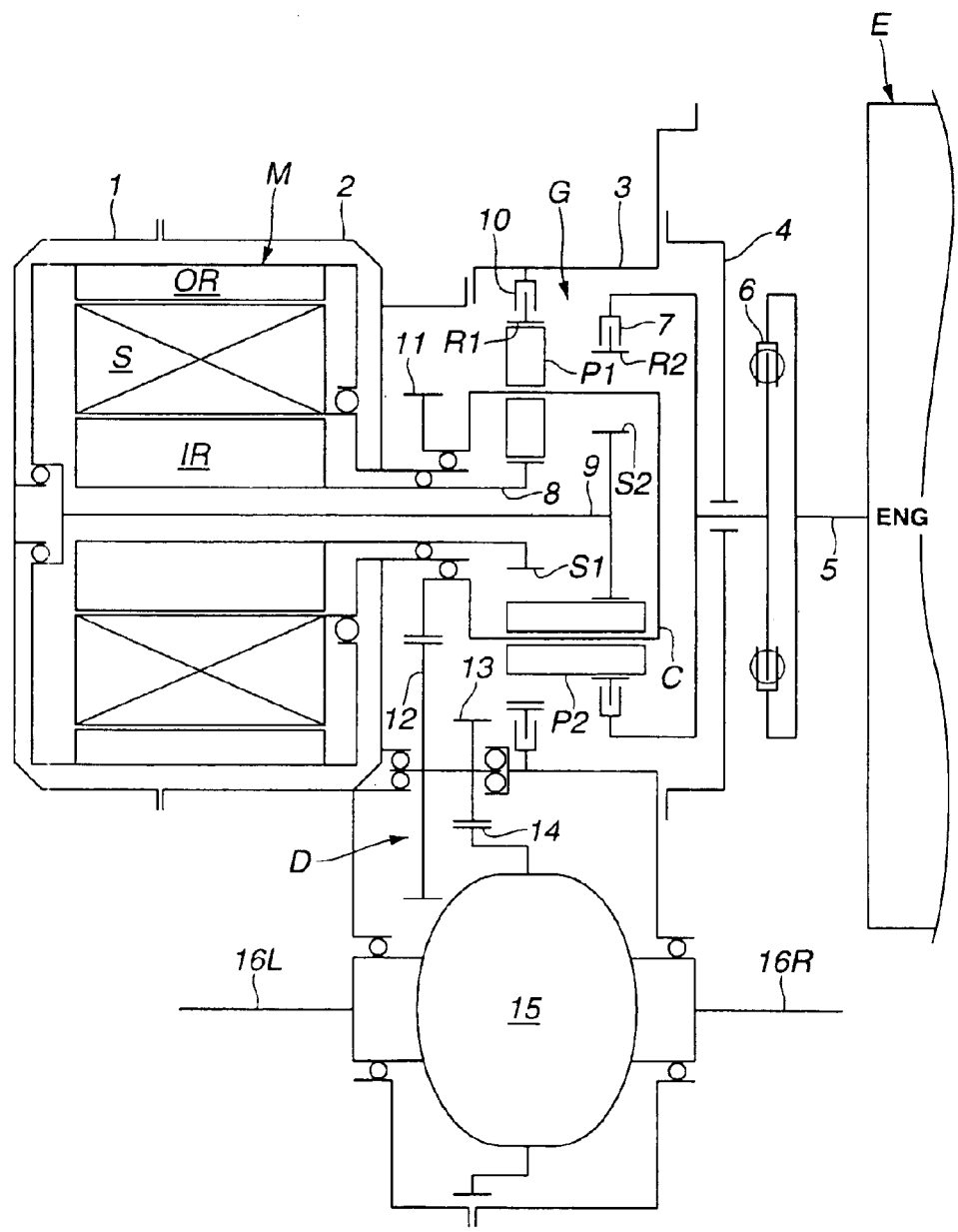
FIG. 1 is a schematic view showing a hybrid power system including a multi-shaft, multi-layer motor according to one embodiment of the present invention.

FIG. 1 shows a hybrid drive system or unit including a multi-shaft, multi-layer motor M according to the embodiment of the present invention. The hybrid drive unit of FIG. 1 includes an engine E, multi-shaft, multi-layer motor M, and a gear mechanism including a Ravigneaux type compound planetary gear train G, and a drive output mechanism D. As shown in FIG. 1, there are provided a motor casing which is composed of a motor cover 1 and a motor case 2 in the illustrated example, a gear housing 3 and a front cover 4.

Engine E is a primary power source in the hybrid drive system of this example. An engine output shaft 5 of engine E is connected with a second ring gear R2 of Ravigneaux compound planetary gear set G, through a damper system 6 for absorbing rotational fluctuation, and a multiple disk clutch 7.

Multi-shaft, multi-layer motor M is a secondary power source in the hybrid system of this example. Despite its appearance like a single motor unit, multi-shaft, multi-layer motor M can function as two motor/generators. Multi-shaft, multi-layer motor M of this example includes a stator S, an inner rotor IR surrounded coaxially by stator S, and an outer rotor OR surrounding stator S coaxially. Thus, multi-shaft, multi-layer motor M of this example has a coaxial three-layer structure. Stator S is fixed to motor case 2, and provided with coils 42. Inner rotor IR includes permanent magnets 21 embedded therein. Outer rotor OR includes permanent magnets 61 embedded therein.

A first motor hollow shaft 8 is fixed with inner rotor IR, and connected to a first sun gear S1 of Ravigneaux compound planetary gear train G. A second motor shaft 9 is fixed with outer rotor OR, and connected to a second sun gear S2 of Ravigneaux compound planetary gear train G.

Ravigneaux compound planetary gear train G is a planetary gear system which can vary the speed ratio continuously in a stepless manner by controlling the two motor (or rotor) speeds of multi-shaft, multi-layer motor M. A common planet carrier C supports first pinions P1 and second pinions P2 each engaging with one of first pinions P1. Ravigneaux compound planetary gear train G of this example has the following five active rotary elements: common carrier C; first sun gear 51 engaging with first pinions P1; second sun gear S2 engaging with second pinions P2; a first ring gear R1 engaging with first pinions P1; and a second ring gear R2 engaging with second pinions P2. A multiple disk brake 10 is connected between first ring gear R1 and gear housing 3. Common carrier C is connected with an output gear 11.

Drive output mechanism D includes output gear 11 connected with common carrier C, a first counter gear 12, a second counter gear 13, a drive gear 14, a differential 15, and left and right drive shafts 16L and 16R. Output torque is transmitted from output gear 11, through first counter gear 12→second counter gear 13→drive gear 14→differential 15, and further transmitted through left and right drive shafts 16L and 16R to drive wheels of the vehicle.

In this hybrid drive system, second ring gear R2 is connected with engine output shaft 5; first sun gear S1 is connected with inner rotor IR by first motor hollow shaft 8; second sun gear S2 is connected with outer rotor OR by second motor shaft 9; and common carrier C is connected with output gear 11.

Figure 2:
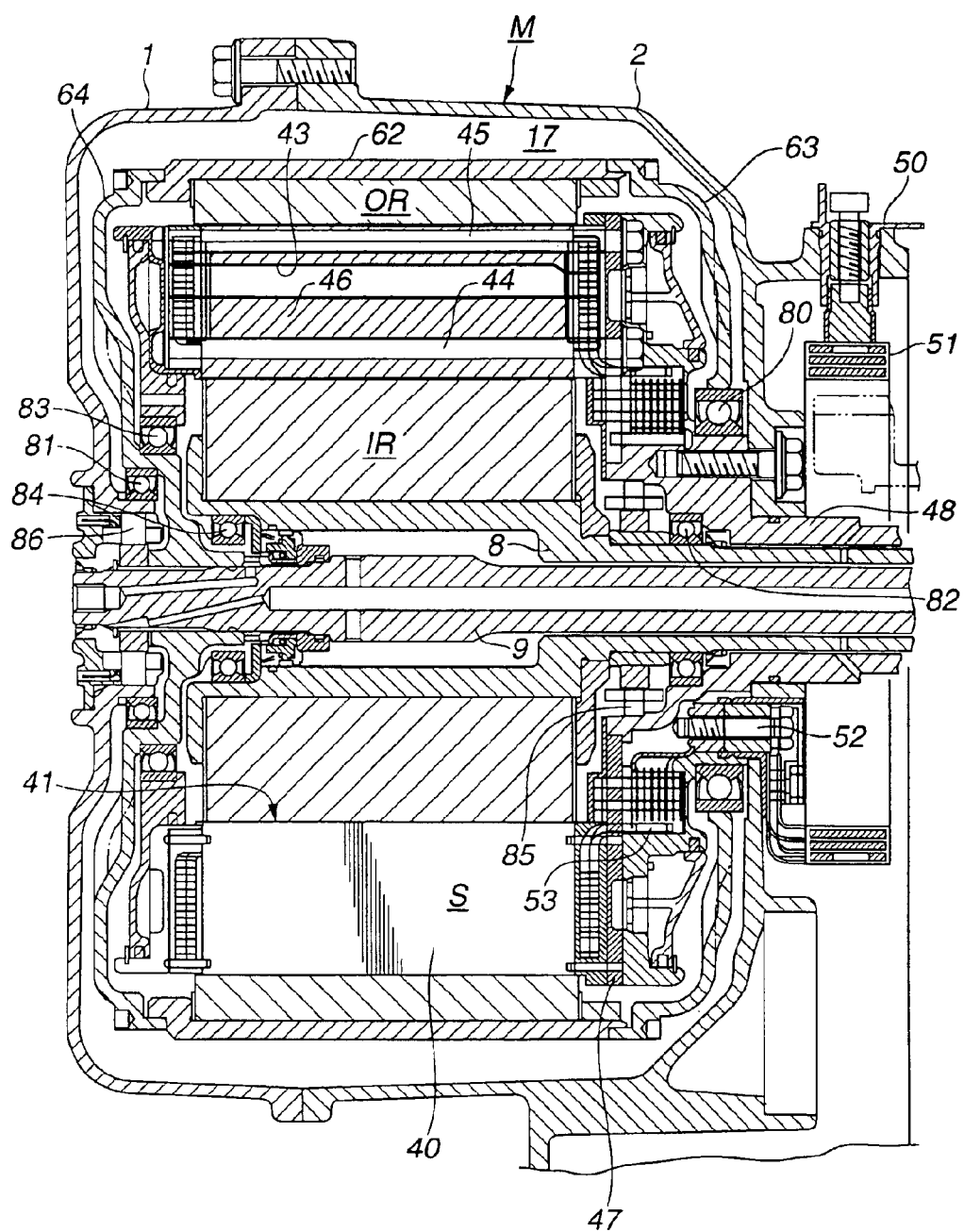
FIG. 2 is a vertical sectional view showing the multi-shaft, multi-layer motor according to the embodiment.
Figure 3:
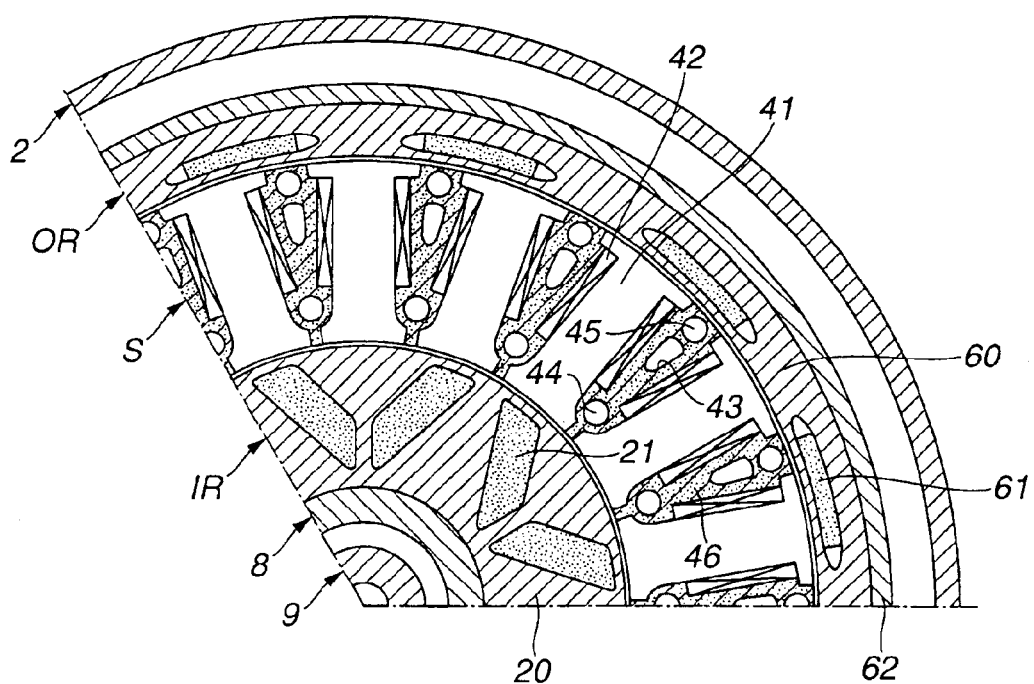
FIG. 3 is a cross sectional view showing a part of the multi-shaft, multi-layer motor of FIG. 2, as viewed from a front side.
Figure 4:
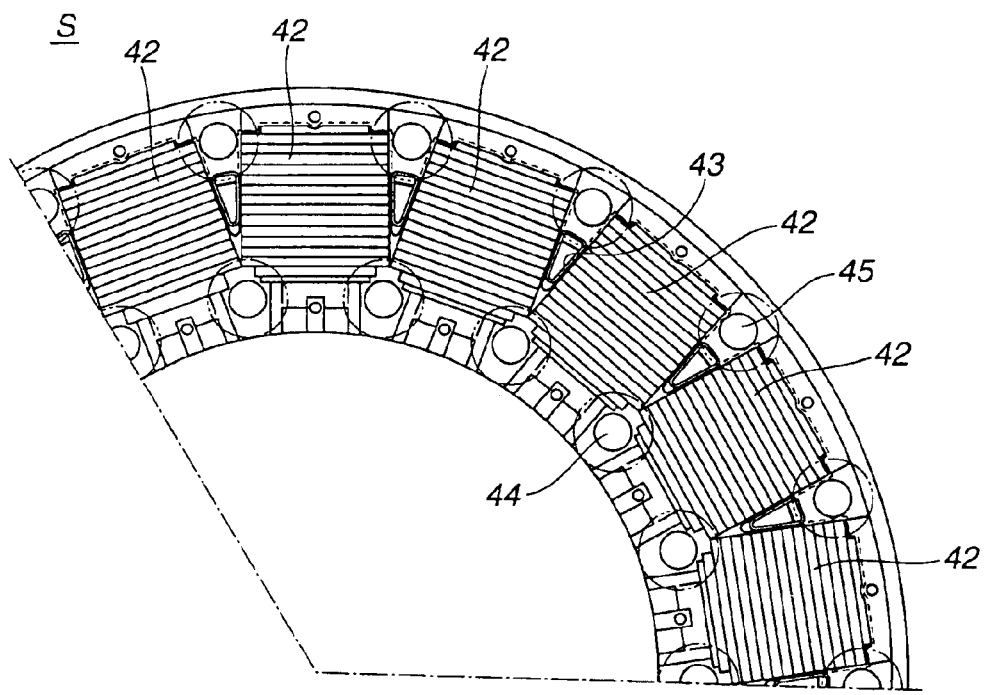
FIG. 4 is a view showing a part of the multi-shaft, multi-layer motor of FIG. 2, as viewed from a back side.

FIGS. 2, 3 and 4 show multi-shaft multi-layer motor M having a cooling structure according to the embodiment. In a motor chamber 17 enclosed by motor cover 1 and motor case 2 as shown in FIG. 2, there is disposed multi-shaft, multi-layer motor M composed of inner rotor IR, stator S and outer rotor OR.

Inner rotor IR is fixed to first motor hollow shaft 8. In this example, inner rotor IR is fixed to first motor hollow shaft 8 by press-fit (or shrinkage fit) of the inner cylindrical surface of inner rotor IR on a stepped shaft end of first motor hollow shaft 8. Twelve inner rotor magnets 21 (permanent magnets) are arranged to produce desirable magnetic flux, and embedded axially in a rotor base 20 of inner rotor IR, as shown in FIG. 3. In this example, two of the magnets 21 are paired in a V-shaped form, and polarized to the same polarity, so that there are three pole pairs.

Stator S includes stator piece laminated members 41 of thin superposed stator pieces 40; coils 42; coolant passages 43 conveying cooling water for cooling stator S; inner bolts 44; outer bolts 45; and a resin molding portion 46 of non-magnetic material. A front end of stator S is fixed, through a front end plate 47 and a stator case 48, to motor case 2. Inner and outer bolts 44 and 45 are inserted through front and rear end plates 47 and 48, and tightened with nuts, to form the skeleton structure of stator S by fastening the components together.

There are eighteen of the coils 42 in this example. These coils 42 are arranged in a circle in the form of three repetitions of 6-phase coils, as shown in FIG. 4. A compound current as shown in FIG. 8 is applied from an inverter (not shown), to the six-phase coils 42, through a feed terminal 50, a bus bar radial lamination 51, a feed connector 52 and a bus bar axial lamination 53. This compound current is composed of 3-phase alternating current for driving outer rotor OR, and 6-phase alternating current for driving inner rotor IR.

An outer rotor case member is a member supporting outer rotor OR. In this example, the outer rotor case member is composed of an outer rotor circumferential member (or outer rotor case) 62, a front end member (or front connecting member) 63 and a rear end member (or rear connecting member) 64. Circumferential member 62 forms a circumferential portion surrounding outer rotor OR and extends axially from a front end to a second end. Front end member 63 is fixed to the front end of circumferential member 62. Front end member 63 has a front radial portion extending radially inwards from the front end of circumferential member 62. Rear end member 64 is fixed to the rear end of circumferential member 62. Rear end member 64 has rear radial portion extending radially inwards from the rear end of circumferential member 62.

Outer rotor OR is fit in outer rotor circumferential member 62, and fixed to outer rotor circumferential member 62 by brazing or by bonding. Second motor shaft 9 is connected by splines to rear connecting case 64 of the outer rotor case member. As shown in FIG. 3, outer rotor magnets 61 (permanent magnets) are arranged so as to produce magnetic flux and embedded in a rotor base 60 of outer rotor OR. Each outer rotor magnet 61 of this example extends axially, and is elongated in the circumferential direction. Each outer rotor magnet 61 has hollow portions on both circumferential sides. In this example, there are provided twelve of the outer rotor magnets 61. Unlike inner rotor magnets 21, the polarity is changed one by one, and there are formed six pole pairs.

As shown in FIG. 2, front and rear outer rotor bearings 80 and 81 support outer rotor OR on motor case 2 and motor caver 1. An inner rotor bearing 82 supports inner rotor IR on motor case 2. A stator bearing 83 supports stator S on outer rotor OR. A bearing 84 is an intermediate bearing disposed between first motor hollow shaft 8 and second motor shaft 9.

As shown in FIG. 2, an inner rotor resolver 85 is a device for sensing a rotational position of inner rotor IR. An outer rotor resolver 86 is for sensing a rotational position of outer rotor OR.

Figure 5:
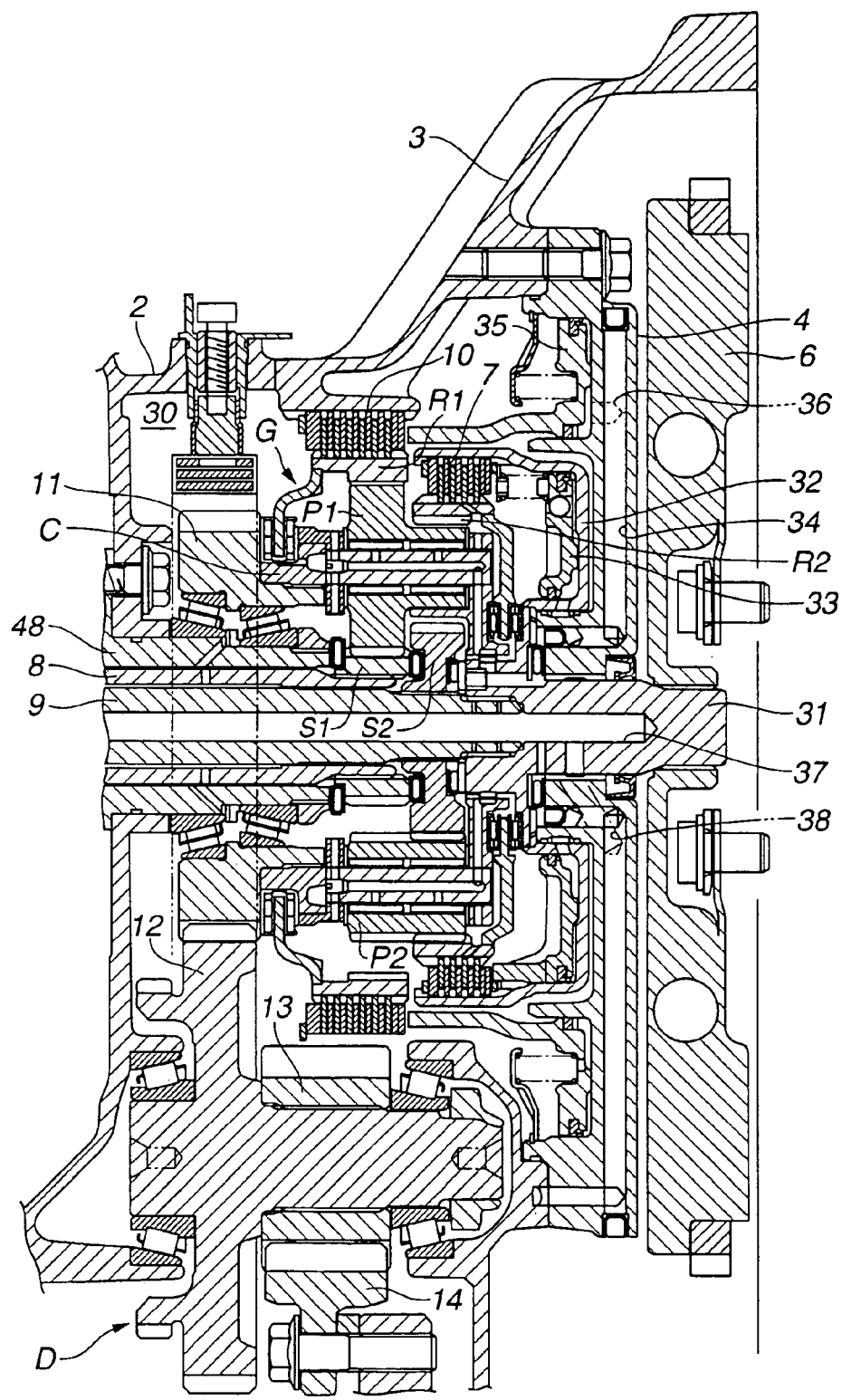
FIG. 5 is a vertical sectional view showing a Ravigneaux planetary gear train G and a drive output mechanism D in the hybrid power system of FIG. 1.

As shown in FIG. 5, Ravigneaux planetary gear train G and drive output mechanism D are disposed in a gear chamber 30 enclosed by motor case 2, gear housing 3 and front cover 4.

When multiple disk clutch 7 is engaged, drive torque of engine E is inputted to second ring gear R2 of Ravigneaux planetary gear train G, through flywheel damper mechanism 6 for absorbing rotational fluctuation, a transmission input shaft 31, and a clutch drum 32. First sun gear S1 is connected by splines with first motor hollow shaft 8. Inner rotor IR is connected with first sun gear S1 so that rotation of a first torque and a first rotational speed is inputted from inner rotor IR to first sun gear S1 according to the location of a motor operating point. Second sun gear S2 is connected by splines with second motor shaft 9. Outer rotor OR is connected with second sun gear S2 so that rotation of a second torque and a second rotational speed is inputted from outer rotor OR to second sun gear S2 according to the location of a motor operating point.

Multiple disk brake 10 is disposed between first ring gear R1 and gear housing 3. First ring gear R1 is held by brake 10 when brake 10 is engaged in the case of an operation for starting the vehicle, for example. Common planet carrier C is connected by splines with output gear 11, which is supported rotatably on stator case 48 by bearing.

Drive output mechanism D includes first counter gear 12 engaging with output gear 11, second counter gear 13 provided on a shaft portion of first counter gear 12, and drive gear 14 engaging with second counter gear 13. A final reduction ratio is determined by the ratio between the number of teeth of second counter gear 13 and the number of teeth of drive gear 14.

Front cover 4 is formed with a clutch pressure oil passage 34 for supplying a fluid pressure for a clutch piston 33 of multi disk clutch 7. Front cover 4 is further formed with a brake pressure oil passage 36 for supplying a fluid pressure for a brake piston 35 of multi disk brake 10. On the inner side of front cover 4, clutch piston 33 is surrounded by brake piston 35. Furthermore, transmission input shaft 31 is formed with an axially extending center oil passage 37, to which a lubricating oil is supplied through a lubricating oil introduction passage 38 formed in front cover 4.

A motor chamber 17 is defined by the motor casing which is composed of motor cover 1 and motor case 2 in this illustrated example. In motor chamber 17, there is disposed the multi-shaft, multi-layer motor M including stator S provided with coils 42, and arranged coaxially between inner rotor IR having inner rotor magnets 21 (permanent magnets), and outer rotor OR having outer rotor magnets 61 (permanent magnets).

A first (outer) oil cooling chamber 91 (first wet chamber) is a space enclosed between the outside circumference of outer rotor OR and the inside circumferential surface of the motor casing (1, 2). A second (inner) oil cooling chamber 92 (second wet chamber) is a space surrounded by inner rotor IR. An air chamber 95 (dry chamber) is a space communicating with an air gap 93 between outer rotor OR and stator S and an air gap 94 between inner rotor IR and stator S.

Inner rotor IR is connected with first motor (or rotor) hollow shaft 8. Outer rotor OR is connected with second motor (or rotor) shaft 9 by the outer rotor case member (62, 63, 64).

First oil cooling chamber 91 is bounded between the inside circumferential surface of the motor casing and the outside circumferential surface of the outer rotor case member. Second oil cooling chamber 92 is bounded between the inside circumferential surface of first motor hollow shaft 8 and the outside circumferential surface of second motor shaft 9.

Air chamber 95 is bounded by inside surfaces of the front and rear end members 63 and 64. Air chamber 95 of this example includes a first side chamber formed between the front end of stator S and the front end member 63 of the outer rotor case member, and a second side chamber formed between the rear end of stator S and the rear end member 64.

Figure 6:
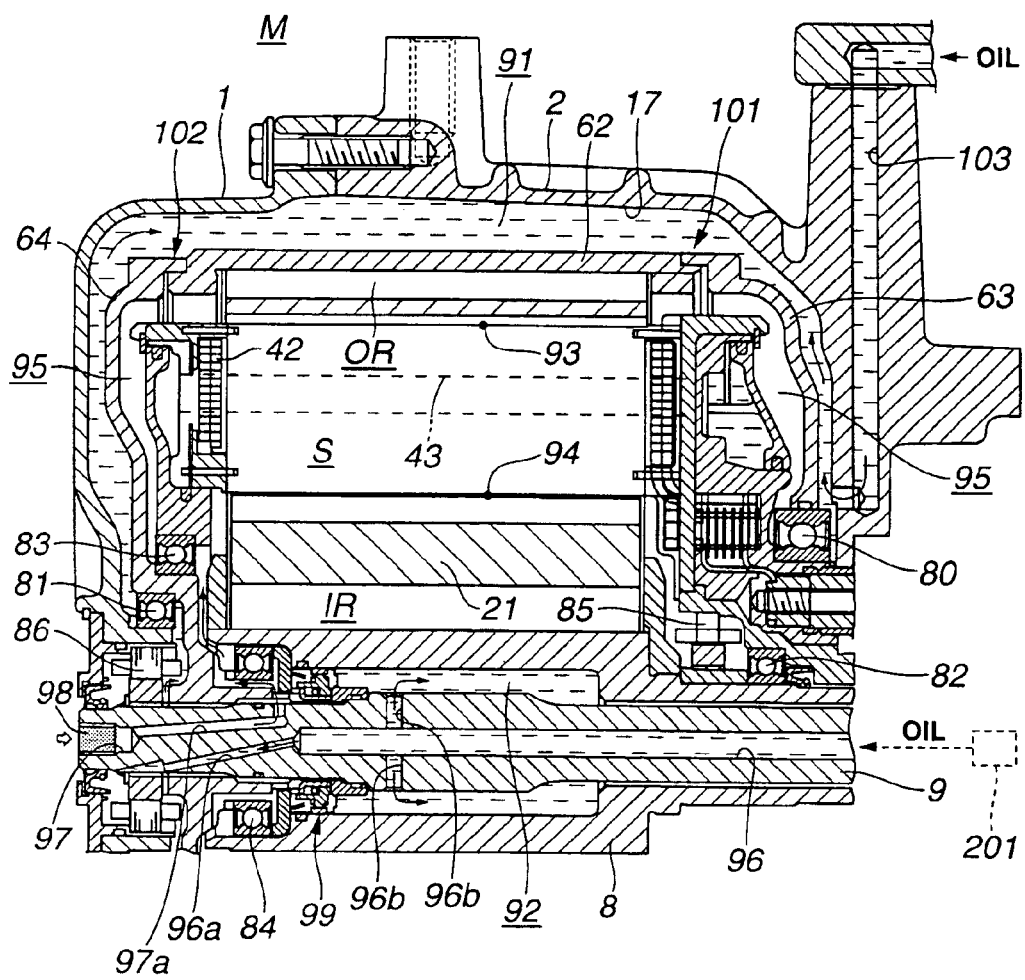
FIG. 6 is an enlarged vertical sectional view showing a cooling structure of the multi-shaft, multi-layer motor of FIG. 2.

An axial oil passage 96 is formed in second rotor shaft 9. Axial oil passage 96 extends axially in second rotor shaft 9 to a rear passage end from the front end of second rotor shaft 9 toward the rear end of second rotor shaft 9. Second rotor shaft 9 is further formed with a first branch lubricant passage 96a leading a lubricant or lubricating oil from axial passage 96 to first oil cooling chamber 91, and a second branch lubricant passage 96b leading the lubricant from axial passage 96 to second oil cooling chamber 92. In the example shown in FIG. 6, first branch passage 96a is inclined, and extends obliquely from the rear end of axial oil passage 96. There are formed a plurality of second branch passages 96b extending radially outwards from axial oil passage 96. Passage 103 can serve as a discharge oil passage.

An axial air passage 97 is formed in second rotor shaft 9. Axial air passage 97 extends axially in second rotor shaft 9 to a front passage end from the rear end of second rotor shaft 9 toward the rear end of axial oil passage 96. A inclined air passage 97a extends from axial air passage 97, and leads air from axial air passage 97 to air chamber 95. An air filter 98 is disposed in axial oil passage 97. In this example, air filter 98 is made of sponge.

First branch oil passage 96a and inclined air passage 97a overlap each other so that both passages 96a and 97a extend axially through a common section of second rotor shaft 9 between two separate cross sections of second rotor shaft 9.

A sealing member 99 is disposed radially between first rotor hollow shaft 8 and second rotor shaft 9, and arranged to separate second oil cooling chamber 92 from air chamber 95.

A discharge passage or opening 100 is formed between air chamber 95 and first oil cooling chamber 91 at a position radially outside the outer air gap 93 between outer rotor OR and stator S, and arranged to discharge oil and other fluid by a centrifugal force from air chamber 95 radially outwards into first oil cooling chamber 91.

In this example, discharge passage 100 is formed in each of a first joint portion 101 between circumferential member 62 and first end member 63, and a second joint portion 102 between circumferential member 62 and second end member 64.

Figure 7A:
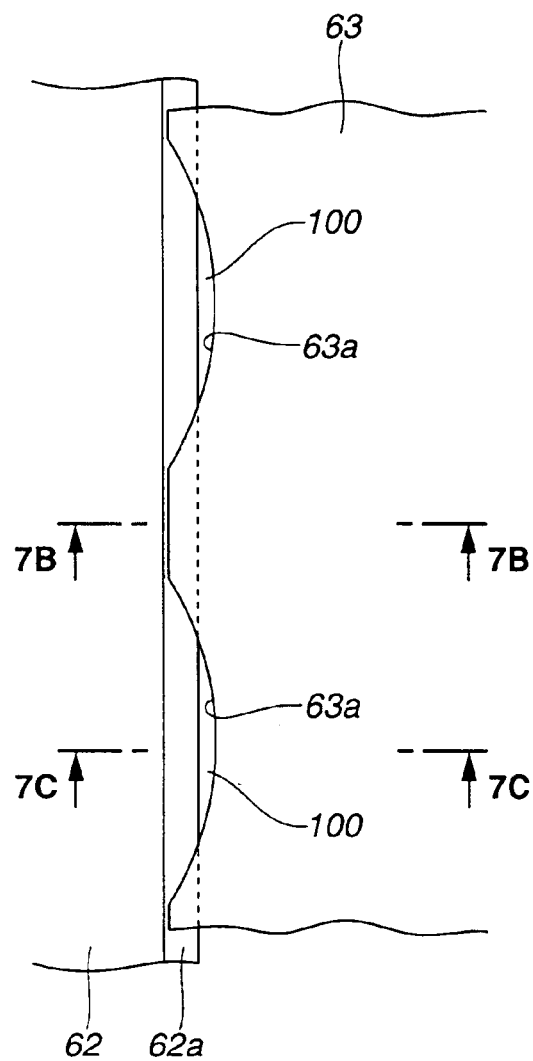
FIG. 7A is a plan view showing discharge openings or apertures formed in a joint portion of an outer rotor case member in the cooling structure shown in FIG. 6.
Figure 7B:
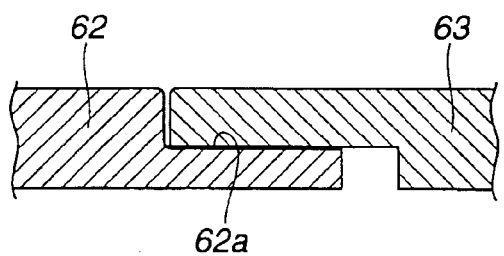
FIG. 7B is a sectional view taken across a line 7B—7B shown in FIG. 7A.
Figure 7C:
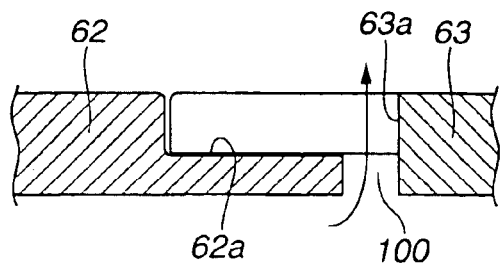
FIG. 7C is a sectional view taken across a line 7C—7C shown in FIG. 7A.

As shown in FIGS. 7A, 7B and 7C, front end member 63 of this example has a stepped upper end portion fit over a stepped front end portion of circumferential member 62, and the stepped upper end portion of front end member 63 has curved recessed portions 63a each of which is recessed axially away from circumferential member 62, to form a discharge aperture allowing liquid to be discharged radially outwards from the first side chamber of air chamber 95 into first oil cooling chamber 91 and thereby serving as discharge passage 100. In this example, rear end member 64 has a stepped upper end portion shaped in the same manner to form discharge apertures allowing liquid to be discharged radially outwards from second side chamber of air chamber 95 into first oil cooling chamber 91, and thereby serving as discharge passage 100.

Multi-shaft, multi-layer motor M has the coaxial structure of two rotors and one stator for driving outer rotor OR and inner rotor IR. Stator coils 42 and a coil inverter are used in common for inner rotor IR and outer rotor OR. A motor control system can control inner and outer rotors IR and OR independently by supplying, to coils 42, a compound current formed by superposing a first current for driving inner rotor IR and a second current for driving outer rotor OR, as shown in FIG. 8. Multi-shaft, multi-layer motor M is a single motor in appearance, but this multi-shaft, multi-layer motor M can function as two motor/generators which can be controlled independently. The thus-constructed motor M is advantageous in size, cost and weight, as compared to an arrangement including a motor having a rotor and a stator, and a generator having a rotor and a stator.

Moreover, the common use of stator coils for inner and outer rotors is effective in reducing the loss such as copper loss and switching loss. By controlling the compound current, the motor control system can control multi-shaft, multi-layer motor M flexibly in various modes including a mode of motor plus generator, a mode of motor plus motor and a mode of generator plus generator. Especially when used in a power system for a hybrid vehicle as in the illustrated embodiment, multi-shaft, multi-layer motor M can be controlled most effectively and efficiently in accordance with a vehicle operating condition. Such an electrical machine having a common stator and a plurality of rotors is disclosed in U.S. Pat. No. 6,049,152. Explanations and figures of this U.S. Pat. No. 6,049,152 on a rotary electric machine or motor/generator, and drive circuit and method for driving the machine are hereby incorporated by reference.

Rotors IR and OR are cooled in the following manner. The lubricating oil cooled by an oil cooler 201 is supplied through lubricating oil passage 38 formed in front cover 4, to the gear mechanism in gear chamber 30, and into axial oil passage 37 formed in transmission input shaft 31. From axial passage 37 of transmission input shaft 31, the lubricating oil is introduced into axial passage 96 of second motor shaft 9.

From axial passage 96 in second motor shaft 9, the lubricating oil further flows through second branch passages 96b into second (inner) oil cooling chamber 92, and acts to cool inner rotor IR fixedly mounted on first motor shaft 8. From second oil cooling chamber 92, the lubricating oil is introduced into gear chamber 30 through an annular clearance between first motor hollow shaft 8 and second motor shaft 9.

Simultaneously, the lubricating oil flows from axial passage 96 through first branch passage 96a into first (outer) oil cooling chamber 91. Therefore, the oil splashes and cools stator S fixed to the outer rotor case member (62, 63, 64). The lubricating oil is further introduced into first oil cooling chamber 91 through oil passage 103 on the front side.

The thus-constructed cooling structure including first and second oil cooling chambers 91 and 92 can prevent temperature increase of inner rotor magnets 21 and outer rotor magnets 61 effectively, and protect the proper magnetic characteristics against long continuous operation.

Stator S having coils 42 heated by the supply of heavy current is cooled by a cooling water supplied from the outside into a cooling circuit including coolant passages 43. The circulating cooling water cools stator S from the inside and from both axial sides.

Air is passed through air filter 98 for removing particles, and the cleaned air is introduced from the rear side through axial air passage 97 and inclined air passage 97a, into air chamber 95. This air chamber 95 is composed of the front side chamber and the rear side chamber, and both side chambers are connected by outer and inner air gaps 93 and 94. Therefore, each air gap 93 or 94 is protected against oil by the layer of air.

Air chamber 95 adjoins first and second oil chambers 91 and 92 in which the lubricating oil is splashed, and hence a small amount of oil could enter the air chamber 95 notwithstanding the sealing structure. Moreover, the sealing structure could act to confine oil in air chamber 95 once oil is introduced. In the cooling structure according to this embodiment, on the other hand, oil even if brought into air chamber 95, is flung radially outwards by the centrifugal force and discharged through discharge apertures 100 from air chamber 95 into first (outer) oil cooling chamber 91. First oil cooling chamber 91 is not filled with oil, but in a state in which oil is splashed. Therefore, oil can be discharged readily into first oil chamber 91.

The structure including air chamber 95 and discharge apertures 100 can prevent oil from entering air gaps 93 and 94 and thereby protect the motor performance from being deteriorated by an increase in stirring resistance. Moreover, this structure can prevent temperature increase in air gaps 93 and 94 due to shearing of oil.

The cooling structure according to the illustrated embodiment of the present invention includes first (outer) oil cooling chamber 91 surrounding outer rotor OR, second (inner) oil cooling chamber 92 formed inside inner rotor IR, and air chamber 95 communicating with outer and inner air gaps 93 and 94. Therefore, this cooling structure can protect the characteristics of inner rotor magnets 21 and outer rotor magnets 61, and maintain the motor performance by protecting air gaps 93 and 94.

Oil is introduced into first and second oil cooling chambers 91 and 92 through axial passage 96 formed in second rotor shaft 9. This arrangement eliminates the need for oil passage introducing oil through the motor casing, and a sealing structure in a joint of the casing, and simplifies the cooling structure. Moreover, the lubricating oil flowing into first oil chamber 91 can lubricate outer rotor bearing 81 supporting outer rotor OR rotatably on motor cover 1. In this example, each of the bearings other than outer rotor bearing 81 is a grease sealed bearing having a grease sealed structure.

Discharge passage or passages 100 are formed at a radial position on the radial outer side of outer rotor air gap 93, and arranged to discharge oil from air chamber 95. This arrangement can protect air gaps 93 and 94 against oil.

Apertures serving as discharge passages 100 are formed in the joint portions 101 and 102 between circumference member 62 and end members 63 or 64. Therefore, discharge passages 100 can be formed readily and uncostly without the need for operation for opening holes. Recessed portions 63a are smoothly curved, without angle edges, so as to prevent undesirable stress concentration and to improve the durability of the outer rotor case member (62, 63, 64).

The cooled lubricating oil is supplied into gear chamber 30 for the gear mechanism on one hand and into axial passage 96 in second motor shaft 96 through axial oil passage 37 formed in transmission input shaft 31 aligned with second motor shaft 9. The oil is supplied for cooling both the rotors and the gear mechanism from a common oil pressure source.

In the illustrated embodiment, at least one of motor cover 1 and motor case 2 can serve as a first or outer member surrounding the outer rotor and defining a first wet chamber. At least one of motor shafts 8 and 9 can serve as a second or inner member defining a second wet chamber surrounded by the inner rotor. At least one of members 62, 63 and 64 can serve as a third or intermediate member defining a dry chamber.

At least one of items 63, 64, 80, 81 and 83 can serve as means for defining a first wet chamber, and a dry chamber. At least one of items 84 and 99 can serve as means for defining a second wet chamber formed between the first and second rotor shafts. A portion defining passage 96a can serve as means for introducing a lubricant into the first wet chamber. A portion defining passage 96b can serve as means for introducing the lubricant into the second wet chamber. A portion for defining passage 97 or 97a or air filter 98 can serve as means for introducing air into the dry chamber.

This application is based on a prior Japanese Patent Application No. 2002-231676. The entire contents of the prior Japanese Patent Application No. 2002-231676 with a filing date of Aug. 8, 2002 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings. In the illustrated embodiment, the cooling structure is applied to a multi-shaft, multi-layer motor in a drive system for a hybrid vehicle. However, the cooling structure according to the present invention can be applied to various other motors. The scope of the invention is defined with reference to the following claims.

What is claimed is:

1. An apparatus comprising:
   an inner rotor;
   an outer rotor surrounding the inner rotor;
   a stator disposed coaxially between the inner and outer rotors, and arranged to form a multi-shaft, multi-layer motor with the inner and outer rotors;
   a first member surrounding the outer rotor and defining a first wet chamber between the outer rotor and the first member;
   a second member defining a second wet chamber surrounded by the inner rotor; and
   a third member defining a dry chamber communicating with an outer air gap between the stator and the outer rotor, and an inner air gap between the stator and the inner rotor.

2. The apparatus as claimed in claim 1, wherein the stator comprises coils; the inner rotor comprises magnets; the outer rotor comprises magnets; the first member comprises a motor casing surrounding the outer rotor and thereby defining the first wet chamber surrounding the outer rotor; the second member comprises a first rotor hollow shaft connected with the inner rotor, and a second rotor shaft connected with the outer rotor and inserted in the first rotor hollow shaft; and the third member comprises an outer rotor case member connected with the outer rotor so that the outer rotor case member rotates as unit with the outer rotor.

3. The apparatus as claimed in claim 2, wherein the third member is formed with a discharge passage located at a radial position outside a radial position of the outer air gap, and arranged to discharge fluid from the dry chamber to the first wet chamber.

4. The apparatus as claimed in claim 3, wherein the second rotor shaft is formed with an axial lubricant passage extending axially from a first axial end portion of the second rotor shaft toward a second axial end portion of the second rotor shaft, a first branch lubricant passage leading a lubricant from the axial lubricant passage to the first wet chamber, and a second branch lubricant passage leading the lubricant from the axial lubricant passage to the second wet chamber.

5. The apparatus as claimed in claim 4, wherein the second rotor shaft is formed with an axial air passage extending axially from the second end portion toward the first axial end portion of the second rotor shaft, and a second air passage leading air from the axial air passage to the dry chamber.

6. The apparatus as claimed in claim 2, wherein the first wet chamber is a first oil chamber bounded radially between an inside surface of the motor casing and an outside surface of the outer rotor case member; the second wet chamber is a second oil chamber bounded radially between an inside surface of the first rotor hollow shaft and an outside surface of the second rotor shaft; and the dry chamber is an air chamber including a first side chamber formed on a first axial side of the stator and a second side chamber formed on a second axial side of the stator so that the stator is located axially between the first and second side chambers.

7. The apparatus as claimed in claim 6, wherein the second rotor shaft is formed with an axial lubricant passage extending axially from a first axial end portion of the second rotor shaft toward a second axial end portion of the second rotor shaft, a first branch lubricant passage leading a lubricant from the axial lubricant passage to the first wet chamber, and a second branch lubricant passage leading the lubricant from the axial lubricant passage to the second wet chamber.

8. The apparatus as claimed in claim 7, wherein the second rotor shaft is formed with an axial air passage extending axially from the second end portion toward the first axial end portion of the second rotor shaft, and a second air passage leading air from the axial air passage to the dry chamber.

9. The apparatus as claimed in claim 2, wherein the second rotor shaft is formed with an axial lubricant passage extending axially from a first axial end portion of the second rotor shaft toward a second axial end portion of the second rotor shaft, a first branch lubricant passage leading a lubricant from the axial lubricant passage to the first wet chamber, and a second branch lubricant passage leading the lubricant from the axial lubricant passage to the second wet chamber.

10. The apparatus as claimed in claim 9, wherein the second rotor shaft is formed with an axial air passage extending axially from the second end portion toward the first axial end portion of the second rotor shaft, and a second air passage leading air from the axial air passage to the dry chamber.

11. The apparatus as claimed in claim 10, wherein the first branch lubricant passage and the second air passage overlap each other so that both passages extend axially through a common section of the second rotor shaft between two separate cross sections of the second rotor shaft.

12. The apparatus as claimed in claim 2, wherein the outer rotor case member includes a circumferential portion surrounding the outer rotor and extending axially from a first axial end to a second axial end, a first radial portion extending radially inwards from the first axial end of the circumferential portion and having an inside surface defining the first side chamber of the dry chamber, and a second radial portion extending radially inwards from the second axial end of the circumferential portion and having an inside surface which faces axially toward the inside surface of the first radial portion across the stator, and which defines the second side chamber of the dry chamber.

13. The apparatus as claimed in claim 12, wherein the circumferential portion of the outer rotor case member includes a circumferential member surrounding the outer rotor and extending axially from the first axial end to the second axial end; the first radial portion of the outer rotor case member includes a first end member which is joined with the first axial end of the circumferential member, and which is formed with a portion defining a first aperture formed between the circumferential member and the first end member at a radial position radially outside the outer air gap and arranged to discharge liquid by a centrifugal force from the dry chamber into the first wet chamber; and the second radial portion of the outer rotor case member includes a second end member which is joined with the second axial end of the circumferential member and which is formed with a portion defining a second aperture formed between the circumferential member and the second end member at a radial position radially outside the outer air gap and arranged to discharge liquid from the dry chamber into the first wet chamber.

14. The apparatus as claimed in claim 12, wherein the second radial portion of the outer rotor case member is connected with the second rotor shaft, and supported rotatably by an outer rotor bearing disposed in an interspace which is formed between the motor casing and the second radial portion of the outer rotor case member, and which is in fluid communication with the first wet chamber; the first rotor hollow shaft is rotatably supported on the second rotor shaft by an intermediate bearing disposed between the first rotor hollow shaft and the second rotor shaft; and the second wet chamber is separated from the dry chamber by a sealing member disposed between the first rotor hollow shaft and the second rotor shaft.

15. The apparatus as claimed in claim 2, wherein the apparatus further comprises an engine and a gear mechanism connected with the engine and the multi-shaft, multi-layer motor, to form a hybrid drive system driving a hybrid vehicle, and a member formed with an introduction passage to lead the lubricant into the gear mechanism and into the first and second wet chambers.

16. A multi-shaft, multi-layer motor comprising:
an inner rotor;
an outer rotor surrounding the inner rotor;
a stator disposed coaxially between the inner and outer rotors;
a motor casing enclosing the outer rotor, the stator and the inner rotor;
a hollow shaft connected with the inner rotor;
a center shaft connected with the outer rotor and received in the hollow shaft;
means for defining a first wet chamber formed radially between the motor casing and the outer rotor, and a dry chamber communicating with an outer air gap between the stator and the outer rotor, and an inner air gap between the stator and the inner rotor;
means for defining a second wet chamber formed between the first and second rotor shafts;
means for introducing a lubricant into the first wet chamber;
means for introducing the lubricant into the second wet chamber; and
means for introducing air into the dry chamber.

* * * * *